United States Patent
Das et al.

(10) Patent No.: US 7,500,232 B2
(45) Date of Patent: Mar. 3, 2009

(54) METHODS FOR ENHANCING FLOW ANALYSIS

(75) Inventors: Manuvir Das, Kirkland, WA (US); Manuel A. Fahndrich, Bellevue, WA (US); Jakob Rehof, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/834,680

(22) Filed: Apr. 29, 2004

(65) Prior Publication Data

US 2004/0205742 A1 Oct. 14, 2004

Related U.S. Application Data

(63) Continuation of application No. 09/609,494, filed on Jun. 30, 2000, now Pat. No. 6,813,761.

(51) Int. Cl.
*G06F 9/45* (2006.01)

(52) U.S. Cl. .................................. 717/154; 717/131

(58) Field of Classification Search ......... 717/151–158, 717/131–133
See application file for complete search history.

(56) References Cited

U.S. PATENT DOCUMENTS

| | | | | |
|---|---|---|---|---|
| 4,636,940 A | * | 1/1987 | Goodwin, Jr. | 717/128 |
| 5,819,074 A | * | 10/1998 | Mangelsdorf | 703/15 |
| 5,854,934 A | * | 12/1998 | Hsu et al. | 717/161 |
| 5,892,940 A | * | 4/1999 | Mangelsdorf | 703/16 |
| 5,920,485 A | * | 7/1999 | Mangelsdorf | 703/16 |
| 5,926,395 A | * | 7/1999 | Mangelsdorf | 703/15 |
| 5,956,498 A | * | 9/1999 | Mangelsdorf | 716/2 |
| 6,012,836 A | * | 1/2000 | Mangelsdorf | 703/6 |
| 6,813,761 B1 | * | 11/2004 | Das et al. | 717/132 |

OTHER PUBLICATIONS

Jim Holmes, "Object-Oriented Compiler Construction", Nov. 29, 1994, pp. 1-15, 19-24, 27-73, 75-124, 133-246,369-383.*
Mannel Fahndrich et al, "Scalable Context-Sensitive Flow Analysis Using Instantiation Contraints", ACM, 2000, pp. 253-263.*

* cited by examiner

*Primary Examiner*—Michael J Yigdall
(74) *Attorney, Agent, or Firm*—Timothy P. Sullivan; Merchant & Gould, PC

(57) ABSTRACT

Methods and structures are described that enhance flow analysis for programs. Whereas previous methods are complicated by the presence of function pointers, the present methods present a framework that abstracts function pointers as if they were any other program expressions so as to allow a desired level of analytical decision within a desired duration of analysis. One aspect of the present invention includes inferring types from a program, forming a type graph from the types, and forming a flow graph from the type graph to inhibit imprecise paths so as to enhance context-sensitivity of flow analysis. The methods may be used in any analysis tools such as code browsers and slicing tools.

15 Claims, 7 Drawing Sheets

```
402 ── int *id(int *p) {      /* id : ptr^{l_1}(α) ──^{l_2} ptr^{l_1}(α) */   ┌─404
          return p;
        }
406 ── foo() {                                    ┌─410
408 ──    int b;              /* b : [β]^{l_3} */
412 ──    id(&b);             /* id_i : ptr^{l_3}(β) ──^{l_4} ptr^{l_3}(β) */
        }                                                    └─414
416 ── bar() {                                    ┌─420
418 ──    int c;              /* c : [γ]^{l_5} */
422 ──    id(&c);             /* id_j : ptr^{l_5}(γ) ──^{l_6} ptr^{l_5}(γ) */  ┌─424
        }
```

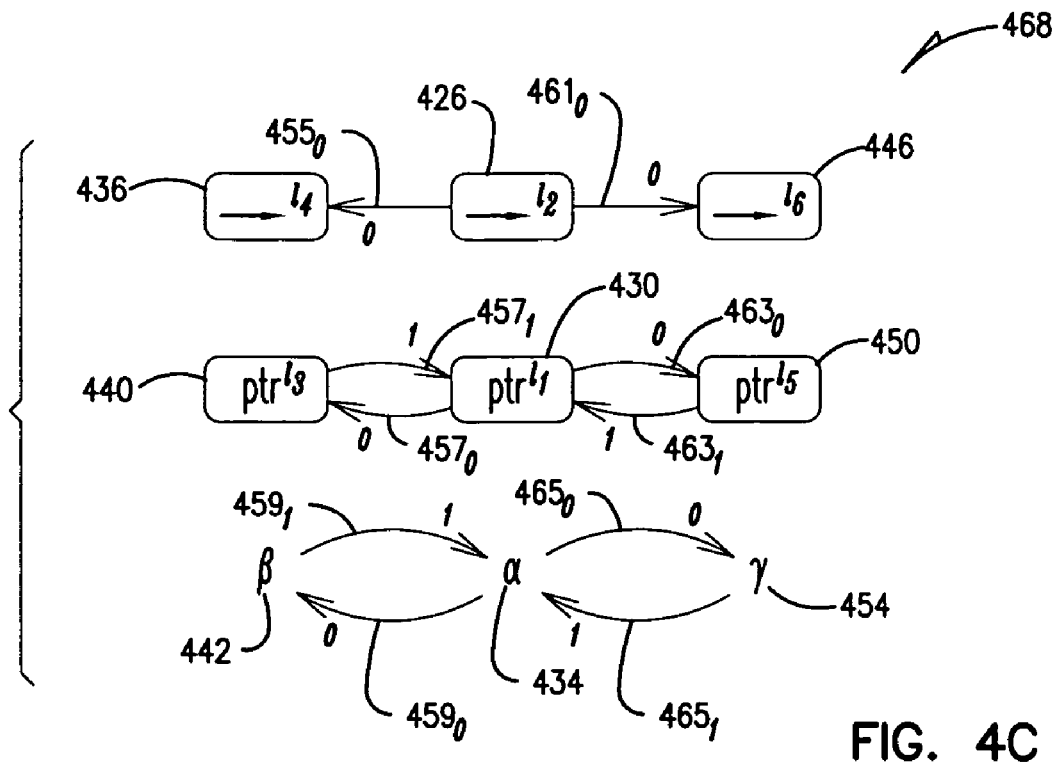
FIG. 4C
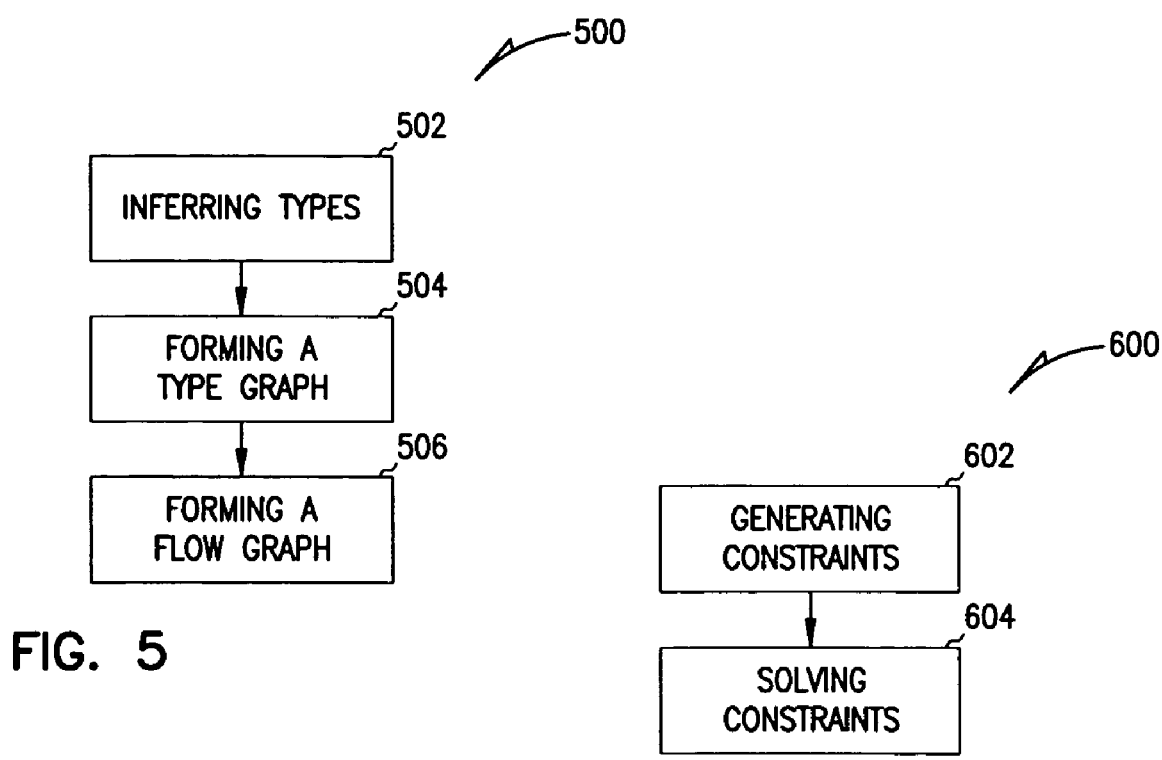
FIG. 5
FIG. 6

METHODS FOR ENHANCING FLOW ANALYSIS

This application is a continuation of application Ser. No. 09/609,494, filed Jun. 30, 2000 now U.S. Pat. No. 6,813,761, which application is incorporated herein by reference.

TECHNICAL FIELD

The technical field relates generally to program analysis. More particularly, it pertains to flow analysis of programs that include function pointers.

COPYRIGHT NOTICE—PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright© 1999, 2000, Microsoft Corporation, All Rights Reserved.

BACKGROUND

A program is a list of statements. This list of statements may be translated, through processes that include compilation, to produce an executable file that can cause a computer to perform a desired action. One type of statement is an assignment statement. An illustrative example of an assignment statement is x=y( ). This statement may be translated to mean that the result-of the invocation of the function variable y is assigned to the variable x.

One type of variable is a function pointer. Pointers are often used in programs because they offer flexibility in coding. A function is a group of statements identified by a name that can be invoked within a program by referencing that name. A function pointer contains a location of a function. Thus, a function pointer points to a function. Through a function pointer, a function may be invoked. In the idiom of software analysis, programs that have function pointers are called higher-order programs, and programs that lack function pointers are called first-order programs.

It is beneficial to analyze programs in order to obtain information that may be used to improve them. One type of analysis focuses on the flow of values in a program. Values arise from various computations in a program to obtain a desired result. Because of the presence of functions within a program, values flow in and out of those functions. The type of analysis that analyzes the flow of values in a program to provide an understanding of the behavior of the program is known as flow analysis. Flow analysis is complicated by the presence of function pointers.

Current flow analyses inefficiently deal with the presence of function pointers. One particular technique is described by the following references: See Ramkrisha Chatterjee et al., *Relevant Context Inference*, Conference Record of the 26$^{th}$ Annual ACM SIGPLAN-SIGACT Symposium on Principles of Programming Languages (January 1999); Donglin Liang and Mary Jean Harrold, *Efficient Points-to Analysis for Whole-Program Analysis*, Proceedings of the 7$^{th}$ European Software Engineering Conference And the 7$^{th}$ ACM SIGSOFT Symposium on the Foundations of Software Engineering (September 1999). Another similar technique is described by the following references: See John Whaley and Martin Rinard, *Compositional Pointer And Escape Analysis for Java Programs*, OOPSLA, pp. 187-206 (1999); Jong-Deok Choi et al., *Escape Analysis for Java*, OOPSLA, pp. 1-19 (1999). A different technique is described by the following references: See Robert P. Wilson and Monica S. Lam, *Efficient Context-Sensitive Pointer Analysis for C Programs*, Proceedings of the 1995 ACM SIGPLAN Conference on Programming Language Design and Implementation (June 1995). Current flow analyses described by the above techniques are either too costly in terms of time or too imprecise in terms of information. Tools that rely on such pointer analyses such as optimizer and debugging tools have been constrained by having to make inferior assumptions about behaviors of programs. As the size of programs has increased with each generation of technology, such inferior assumptions may slow the improvement of programs and lead to the eventual lack of acceptance of such programs in the marketplace.

Thus, what is needed are methods and structures to enhance flow analysis of programs.

SUMMARY

Methods and structures to support enhanced flow analysis are discussed. An illustrative aspect includes a method for enhancing flow analysis. The method includes inferring types for a program, forming a type graph having polarities and indices from the types, and forming a flow graph from the type graph to inhibit imprecise paths so as to enhance context-sensitivity of flow analysis. Another illustrative aspect includes another method for enhancing flow analysis. The method includes forming a type graph that includes polarities and indicies, and forming a flow graph that includes a set of flow paths. The set of flow paths excludes imprecise paths so as to enhance context-sensitivity of flow analysis. Another illustrative aspect includes another method for enhancing flow analysis. The method includes abstracting program expressions into types, and forming a type graph from the types. The type graph includes polarities and indices so as to enhance flow analysis. Another illustrative aspect includes another method for enhancing flow analysis. The method includes annotating each expression in a program by a label, associating the label of an expression with a type of the expression, and tracing at least one path on a type graph having polarities to determine if a value arising at one label in the program flows to another label in the program. Yet another illustrative aspect includes another method for enhancing flow analysis. The method includes forming a type instantiation graph that includes polarities and indices, and computing points-to information for at least one program point by answering reachability queries on the type instantiation graph. The polarities of the type graph as discussed hereinbefore exist on a plurality of instantiation edges of the type graph, in one aspect.

Another illustrative aspect includes a method for inferring types to enhance flow analysis. The method includes generating constraints from a program and solving the constraints to infer at least one type. The act of solving includes propagating polarities so as to enhance flow analysis.

Another illustrative aspect includes a data structure to enhance flow analysis. The data structure includes a data member type to represent a type of a program expression, and a data member flow having a data member polarity and a data member index to represent a flow path between two types.

BRIEF DESCRIPTION OF THE DRAWINGS

FIGS. 4A, 4B, and 4C illustrate a sequence of processing according to one aspect of the present invention.

FIG. 5 is a process diagram of a method according to one aspect of the present invention.

FIG. 6 is a process diagram of a method according to one aspect of the present invention.

DETAILED DESCRIPTION

Figure 1:
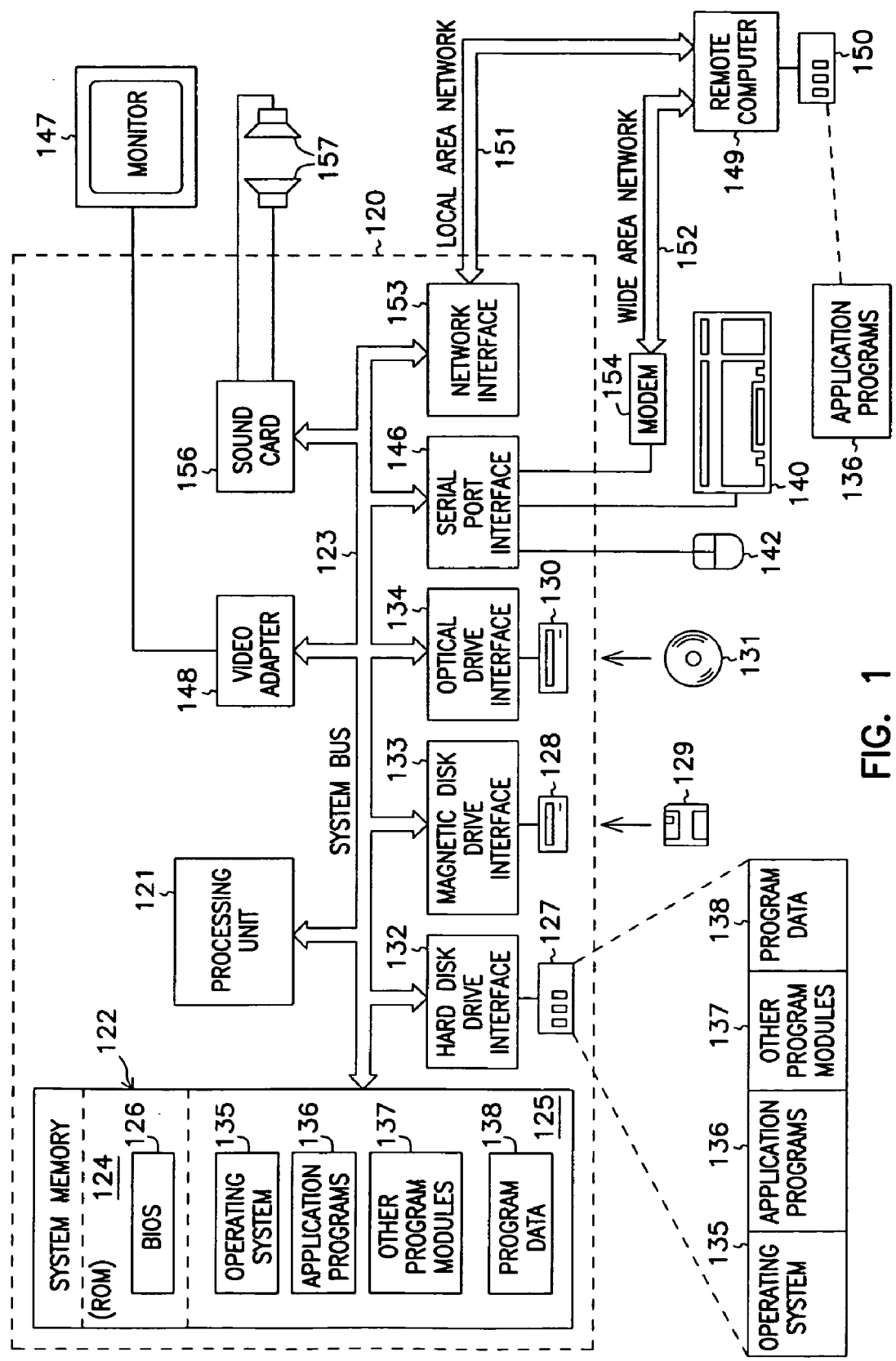
FIG. 1 is a block diagram of a system according to one aspect of the present invention.

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

FIG. 1 is a block diagram of a system according to one aspect of the present invention. FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc., that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like, which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 120, which includes processing unit 121, system memory 122, and system bus 123 that couples the system memory and other system components to processing unit 121. System bus 123 may be any of several types, including a memory bus or memory controller, a peripheral bus, and a local bus, and may use any of a variety of bus structures. System memory 122 includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system. Personal computer 120 further includes hard disk drive 127 for reading from and writing to a hard disk (not shown), magnetic disk drive 128 for reading from and writing to a removable magnetic disk 129, and optical disk drive 130 for reading from and writing to a removable optical disk 131 such as a CD-ROM or other optical medium. Hard disk drive 127, magnetic disk drive 128, and optical disk drive 130 are connected to system bus 123 by a hard-disk drive interface 132, a magnetic-disk drive interface 133, and an optical-drive interface 134, respectively. The drives and their associated computer-readable media provide nonvolatile storage of computer-readable instructions, data structures, program modules, and other data for personal computer 120. Although the exemplary environment described herein employs a hard disk, a removable magnetic disk 129 and a removable optical disk 131, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 129, optical disk 131, ROM 124, and RAM 125. Program modules may include operating system 135, one or more application programs 136, other program modules 137, and program data 138. A user may enter commands and information into personal computer 120 through input devices such as a keyboard 140 and a pointing device 142. Other input devices (not shown) may include a microphone, joystick, game pad, satellite dish, scanner, or the like. These and other input devices are often connected to the processing unit 121 through a serial-port interface 146 coupled to system bus 123; but they may be connected through other interfaces not shown in FIG. 1, such as a parallel port, a game port, or a universal serial bus (USB). A monitor 147 or other display device also connects to system bus 123 via an interface such as a video adapter 148. In addition to the monitor, personal computers typically include other peripheral output devices such as a sound adapter 156, speakers 157, and additional devices such as printers.

Personal computer 120 may operate in a networked environment using logical connections to one or more remote computers such as remote computer 149. Remote computer 149 may be another personal computer, a server, a router, a network PC, a peer device, or other common network node. It typically includes many or all of the components described above in connection with personal computer 120; however, only a storage device 150 is illustrated in FIG. 1. The logical connections depicted in FIG. 1 include local-area network (LAN) 151 and a wide-area network (WAN) 152. Such networking environments are commonplace in offices, enterprise-wide computer networks, intranets and the Internet.

When placed in a LAN networking environment, PC 120 connects to local network 151 through a network interface or adapter 153. When used in a WAN networking environment such as the Internet, PC 120 typically includes modem 154 or other means for establishing communications over network 152. Modem 154 may be internal or external to PC 120, and connects to system bus 123 via serial-port interface 146. In a networked environment, program modules, such as those comprising Microsoft® Word which are depicted as residing within PC 120 or portions thereof may be stored in remote storage device 150. Of course, the network connections shown are illustrative, and other means of establishing a communications link between the computers may be substituted.

Software may be designed using many different methods, including object-oriented programming methods. C++ is one example of common object-oriented computer programming languages that provide the functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that acts upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

The embodiments of the present invention focus on enhancing flow analysis. The embodiments of the present invention present a framework that analyzes a program that may include function pointers. In the various embodiments, function pointers are treated as if they were any other program expressions. The embodiments of the present invention need not enumerate all the potential functions that may be referenced by a function pointer. The need to enumerate all possibilities may cripple a flow analysis of a large program.

The embodiments of the present invention also enhance the context-sensitivity of flow analysis. Context-sensitivity means the inclusion of keeping a function invocation distinct from another invocation of the same function. This ability to distinguish occurrences of function invocation allows the embodiments of the present invention to have a desired analytical precision within a desired duration of analysis. The following discusses the embodiments of the present invention in more detail.

Figure 9:
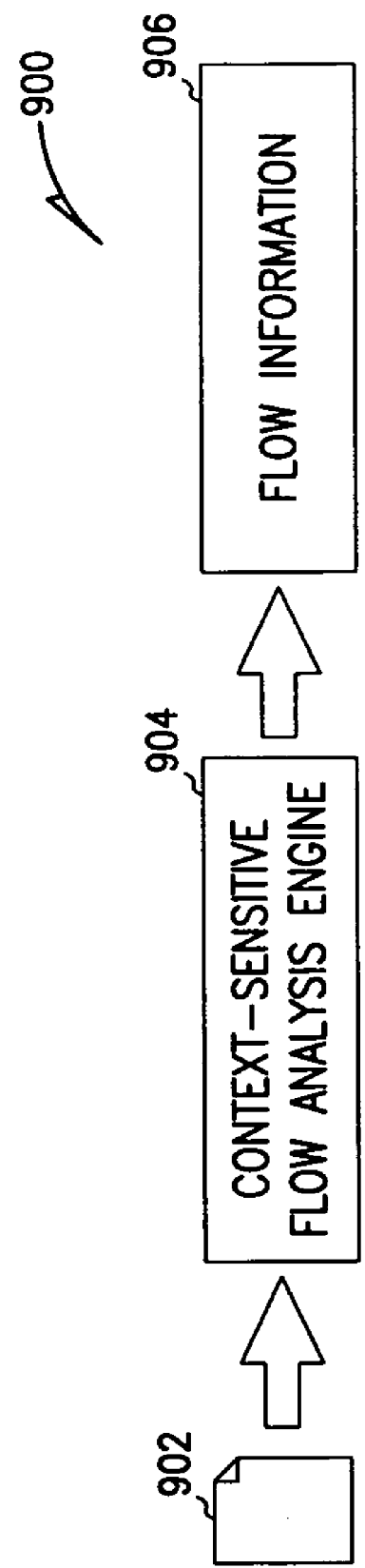
FIG. 9 is a block diagram of a system according to one aspect of the present invention.

FIG. 9 is a block diagram of a system according to one aspect of the present invention. The system 900 includes a source file 902. The source file 902 includes a program that will be analyzed by the system 900. The source file 902 is input into a flow-analysis engine 904. The flow-analysis engine 904 is context-sensitive. In one embodiment, the flow-analysis engine 904 is a piece of software executing on a suitable computing platform. The flow-analysis engine 904 produces flow information 906 that excludes imprecise paths. Imprecise paths would render a flow analysis context-insensitive.

Figure 2:
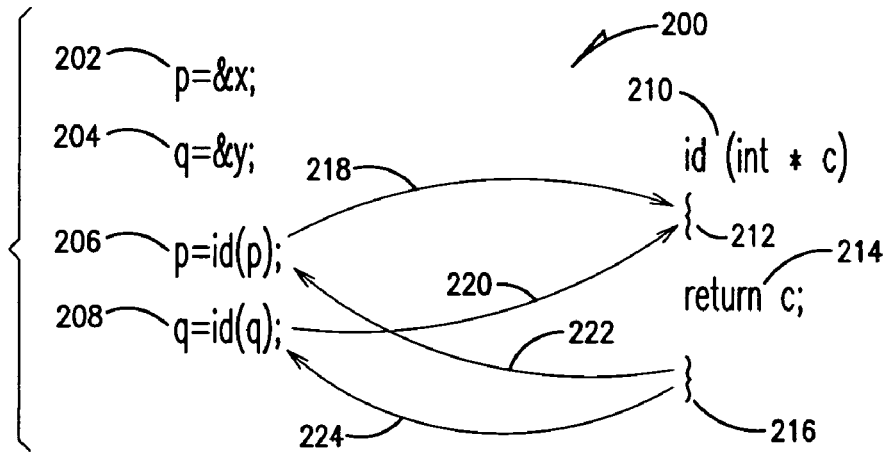
FIG. 2 is a fragment of a program according to one aspect of the present invention.

FIG. 2 is a fragment of a program according to one aspect of the present invention. A fragment 200 of a program includes an assignment statement 202. The assignment statement 202 includes a pointer variable p being assigned an address of a variable x. The fragment 200 includes an assignment statement 204. The assignment statement 204 includes a pointer variable q being assigned an address of a variable y.

The fragment 200 includes an assignment statement 206. The assignment statement 206 includes the pointer variable p being assigned the return value of a function id( ). The function id( ) takes the pointer p as an input argument. The fragment 200 includes an assignment statement 208. The assignment statement 208 includes the pointer variable q being assigned the return value of a function id( ). The function id( ) takes the pointer q as an input argument.

The fragment 200 includes a function id( ) 210. The function id( ) 210 is identified by the name "id." The function id 210 includes an input parameter. The input parameter is a pointer to an integer. The input parameter is identified by the name "c." The function id( ) 210 includes an opened bracket 212 and a closed bracket 216. The opened bracket 112 and the closed bracket 216 define a scope for the function id( ) 210. Thus, statements that exist inside the scope of the function id( ) 210 are considered to be the group of statements that may be executed upon an invocation of the function id( ) 210. The function id( ) 210 includes a return statement 214. The return statement 214 returns the value of the integer pointer variable c.

In a normal sequence of execution of the fragment 200, the assignment statement 206 invokes the function id( ) 210, which is represented by flow path 218. The value of the pointer variable p traverses the flow path 218 from the assignment statement 206 and enters the function id( ) 210 through the input parameter c. Next, the output of the function id( ) 210, which is the value of the integer pointer variable c, traverses the flow path 222 to the assignment 206. The value of the integer pointer variable c is then assigned to the pointer variable p. Similarly, the assignment statement 208 invokes the function id( ) 210, which is represented by flow path 220. The value of the pointer variable q traverses the flow path 220 from the assignment statement 208 and enters the function id( ) 210 through the input parameter c. Next, the value of the integer pointer variable c traverses the flow path 224 to the assignment 208. The value of the integer pointer variable c is then assigned to the pointer variable q.

Without at least one of the embodiments of the present invention, a possibility exists that a static analysis of a value of the pointer p traversing the flow path 218 by an invocation of the function id( ) 210 may return via the flow path 224, or similarly, a value of the pointer q traversing the flow path 220 may return via the flow path 222. Such undesirable flows of values render a flow analysis to be context-insensitive. The undesired paths in which the values flow are defined as imprecise paths. Because the fragment 200 benefits from at least one of the embodiments of the present invention, the discussed imprecise paths are eliminated. Thus, the embodiments of the present invention enhance the context-sensitivity of flow analysis.

Figure 3A:
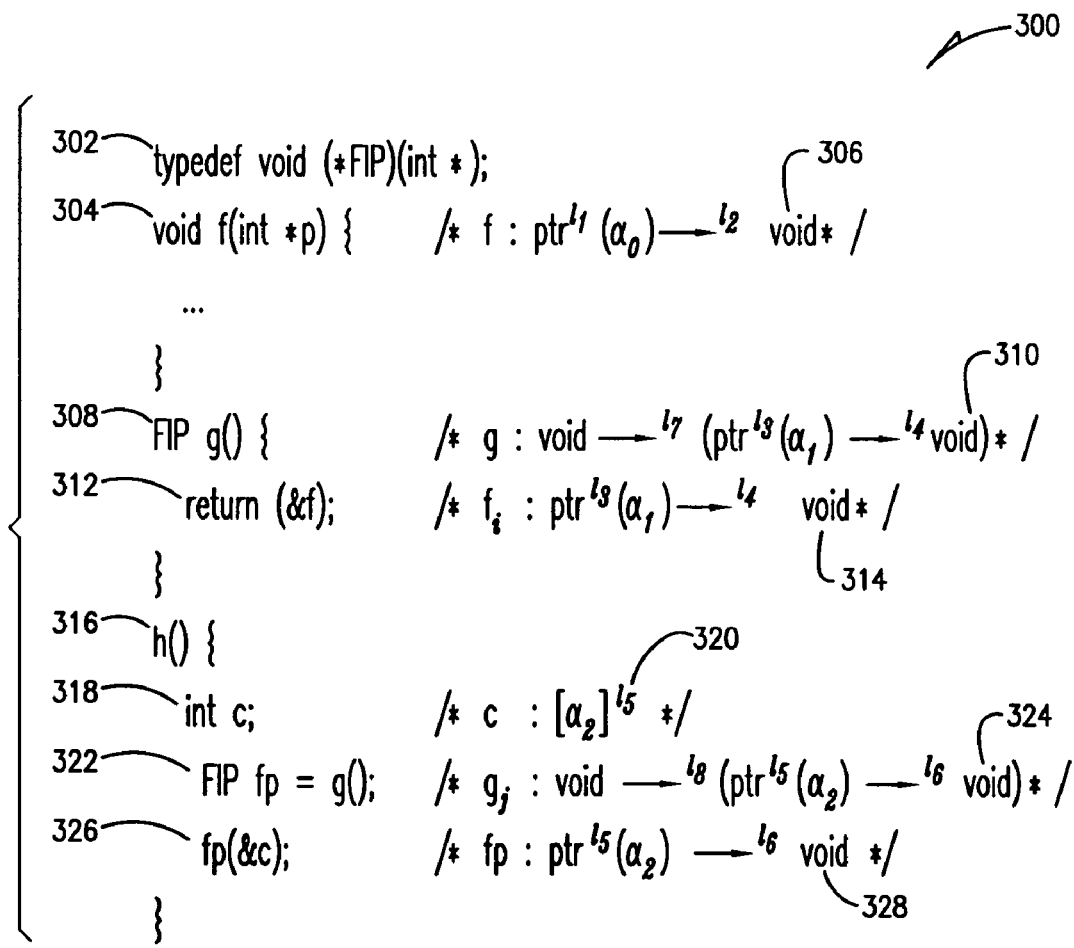
FIGS. 3A, 3B, and 3C illustrate a sequence of processing according to one aspect of the present invention.
Figure 3B:
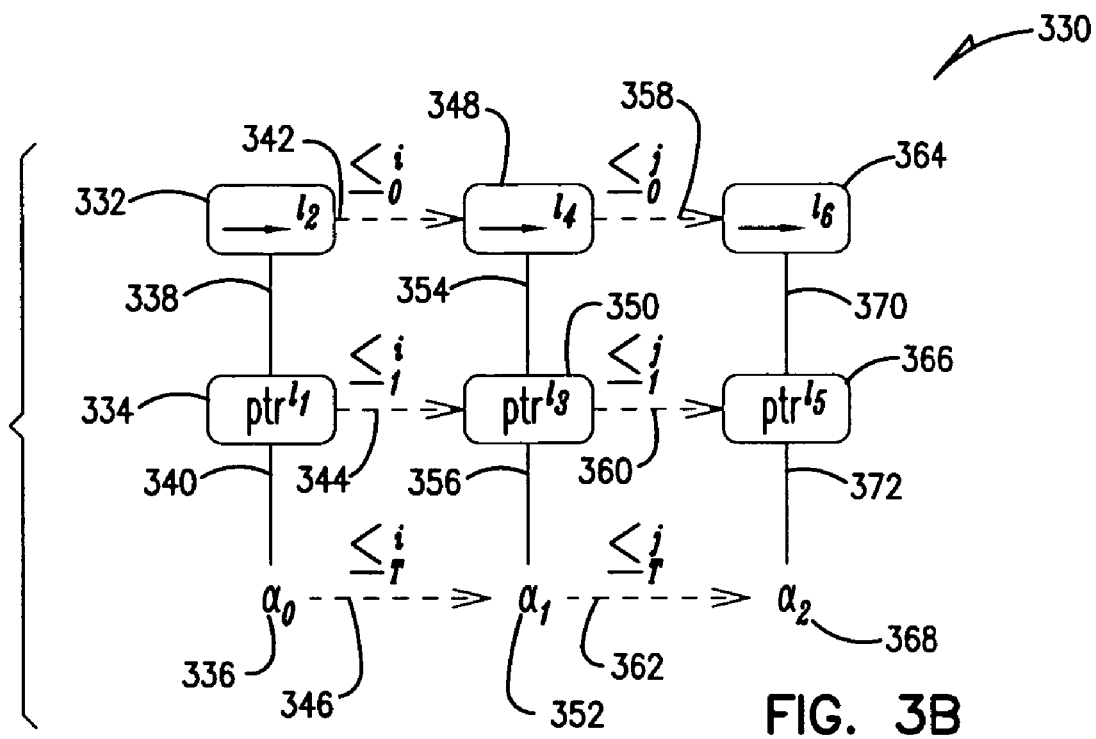
Figure 3C:
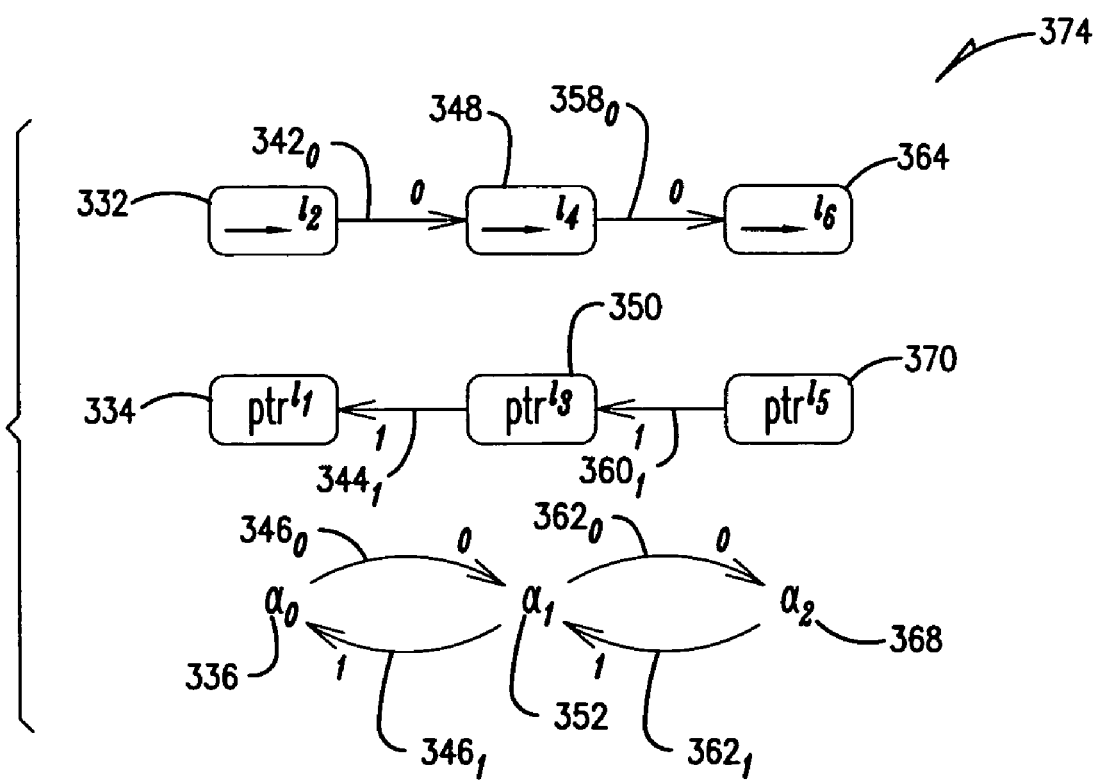

FIGS. 3A, 3B, and 3C illustrate a sequence of processing according to one aspect of the present invention. Through these Figures, various embodiments of the present invention will show that function pointers are treated as if they were any other program expressions that are analyzed in a program analysis. FIG. 3A illustrates a fragment 300 of a program according to one aspect of the present invention. The fragment 300 includes a declaration statement 302. The declaration statement 302 defines a new data type through the "typedef" mechanism. The new data type defined by the declaration statement 302 is identified as "FIP," which is a pointer to a function that takes an integer pointer and returns a void.

The fragment 300 includes a function definition 304. The function definition 304 defines a function that is identified as "f," which is a function that takes an integer pointer and returns a void. The body of the function definition 304 is filled with an ellipsis to indicate that the statements therein are not needed to discuss of the embodiments of the present invention.

The fragment 300 includes a comment 306 delimited by the symbols "/*" and "*/". The comment 306 includes a type expression. Hereinafter, the type expressions in the comments are those after the colons. The symbols before the colons are the identifiers for program expressions for which the type expressions are inferred.

The comment 306 includes inferred types for the signature of the function f as defined in the function definition 304. These inferred types arise from the type-based flow analysis of the embodiments of the present invention. The terms "type" and "type expression" can be used interchangeably in the embodiments of the present invention. Type-based flow analysis assigns types and locations to program expressions. It should be understood that the embodiments of the present invention could be applied to any type languages, including, but not limited to C, C++, or Java.

For the purpose of the fragment 300, three types may be defined to analyze the fragment 300. In one embodiment, these three types may be mathematically described as follows:

$$\tau ::= \alpha \,|\, (\tau_1, \ldots, \tau_n) \rightarrow^l \tau \,|\, \text{ptr}^l(\tau) \tag{1}$$

$\tau$ represents a type. $\alpha$ represents a type variable or an unknown type. $(\tau_1, \ldots, \tau_n) \rightarrow^l \tau$ represents a type for a function signature. The $(\tau_1, \ldots, \tau_n)$ aspect of the type for the function signature represents the input parameters of a function. The $\rightarrow^l$ aspect of the type for the function signature represents a type that maps the $(\tau_1, \ldots, \tau_n)$ aspect to a result type. The $\tau$ aspect of the type for the function signature represents the result type. The $\text{ptr}^l(\tau)$ represents a type for a pointer pointing to an expression of type $\tau$. l is a flow variable. Flow variables are used to uniquely name program expressions of interest, such as pointers, functions, and locations. For example, in the type $(\tau_1, \ldots, \tau_n) \rightarrow^l \tau$, $l$ is the location of a particular function, and in the type $\text{ptr}^l(\tau)$, l is a location named l, such that $\text{ptr}^l(\tau)$ is a pointer to the location names l. Furthermore, $[\tau]^l$ represents a memory location named $l$ that holds values of type $\tau$. Suppose that the programming language of interest is C. Then, $[\tau]^l$ is associated with L-values and $\tau$ is associated with R-values.

Returning to FIG. 3A, the signature of the function f at function definition 304 gives rise to the inferred types shown in the comment 306.

The fragment 300 includes a function definition 308 that defines the function "g." The function g takes void as an input parameter and returns a result type of type FIP as defined in the declaration statement 302. The comment 310 includes an inferred type for the function signature of the function g. The fragment 300 includes a return statement 312. The return statement 312 returns the address of the function f as defined in statement 304. Therefore, the function g returns a function pointer that contains an address of the function f.

The fragment 300 includes a comment 314. The comment 314 includes an instantiation of the type expression for the function f. An instantiation of a type expression is another type. The generic type for such an instantiation is as shown in the comment 306. This generic type is the inferred type for the function signature for the function f. The type that is instantiated from the generic type is known as an instance type. This instance type includes an index i as shown in the comment 306 so as to track a particular occurrence of an invocation of the function f. The numerical references of the flow labels l of the instance type as shown in the comment 314 are different with respect to numerical references of the flow labels l of the generic type as shown in the comment 306. This is due to the process of instantiation so as to differentiate various instances of the generic type.

The fragment 300 includes a function definition 316 for a function identified as "h." The function h includes a declaration statement 318. The declaration statement 318 declares the variable "c" as an integer type. The fragment 300 includes a comment 320 that includes an inferred type for the variable c.

The function h includes a statement 322. The statement 322 is a combination of a declaration statement, a function invocation, and an assignment statement. The statement 322 as a declaration statement declares that the variable fp is of a type FIP. Therefore, fp is a function pointer that points to a function that takes an integer pointer as a parameter and returns type void. The statement 322 also invokes the function g. The statement 322 then assigns the result of the invocation of the function g and assigns the result to the variable fp. As discussed above, the function g returns the location of the function f. Therefore, after execution of the statement 322, the variable fp is a function variable that contains the location of the function f.

The fragment 300 includes a comment 324. The comment 324 includes an instantiation of the generic type for the function signature for the function g as shown in the comment 310. The comment 324 includes an index j to denote an occurrence of an invocation of the function g at the statement 322.

The fragment 300 includes a function invocation statement 326. The function invocation statement 326 invokes the function that is pointed to by the function pointer fp. That function is the function f.

The fragment 300 includes a comment 328. The comment 328 includes the result type of the instance type for the function signature for the function g as shown in the comment 324.

What has been shown in FIG. 3A are acts that transform program expressions into types, for illustrative purposes only. These types are shown in the comments 306, 310, 314, 320, 324, and 326. At least one type of these types may be instantiated from another type to denote an occurrence of a use of a program expression as represented by the instantiated type. Such an instantiation economizes the flow analysis while including information regarding the context-sensitivity. Also what has been shown in FIG. 3A is that function pointers, such as fp in the fragment 300, are transformed into types as if they were any other program expressions.

FIG. 3B shows a graph following the next sequence of processing. A type instantiation graph 330 (hereinafter, the type graph 330) is formed from a portion of the types inferred from the fragment 300. In one embodiment, the type graph 330 represents a complete trace of all instantiations. The type graph 330 includes a number of nodes to represent inferred types. A node 332 represents the inferred type for the function f as shown in the statement 304. A node 334 represents an inferred type for the variable p as shown in statement 304. A node 336 represents a variable that is pointed to by the variable p. The lines 338 and 340 couple the nodes 332, 334, and 336 to show that the types represented by these nodes are related to each other. Nodes 332, 334, and 336 are generated from inferred types from the function signature of the function f as shown in statement 304. The inferred types are shown in the comment 306.

Nodes 348, 350, and 352 are generated from inferred types that are generated from statement 312. The inferred types are shown in the comment 314. The lines 354 and 356 couple the nodes 348, 350, and 352 to show that the types represented by these nodes are related to each other. In one embodiment, each of the nodes 348, 350, and 352 can be viewed as types instantiated from nodes 332, 334, and 336, respectively.

Such instantiations are represented by the instantiation paths 342, 344, and 346. An instantiation path emanates from a generic type and terminates at an instance type. The instantiation path includes an arrowhead to show an instantiation direction. The instantiation path includes an instantiation constraint that is symbolized by.

$$\leq_{polarity}^{index}.$$

This instantiation constraint is an inequality to represent that a type is an instance of another type. The inequality includes an index and a polarity. The index represents an occurrence of the instantiation, or more specifically, an occurrence of the use of a program expression. The polarity can be a 0, which is a positive polarity, or a 1, which is a negative polarity, or a T, which is a bidirectional polarity.

Nodes 364, 366, and 368 are generated from inferred types that are generated from statement 322. The inferred types are shown in the comments 324 and 328. The lines 370 and 372 couple the nodes 364, 366, and 368 to show that the types represented by these nodes are related to each other. In one embodiment, each of the nodes 364, 366, and 368 can be viewed as types instantiated from nodes 348, 350, and 352, respectively.

FIG. 3C shows a graph following the next sequence of processing. A flow graph 374 is formed from the type graph 330. In one embodiment, the flow graph 374 retains the nodes of the type graph 330. The flow graph 374 includes flow paths $342_0$ and $358_0$. The flow paths $342_0$ and $358_0$ emanate from the generic types and terminate at the instance types. Thus, the flow paths $342_0$ and $358_0$ have the same flow direction as the instantiation direction of the instantiation paths that relate the nodes 332, 348, and 364 together. Therefore, in one embodiment, it can be considered that the flow path between two nodes inherits the polarity from the instantiation path that relates the same two nodes. If the polarity is positive (or 0), the flow direction is the same as the instantiation direction. The flow graph 374 includes the flow paths $344_1$ and $360_1$. The polarity of the flow paths $344_1$ and $360_1$ are negative (or 1), and thus, the flow direction of these flow paths are opposite the instantiation direction of the corresponding instantiation paths 344 and 360. The flow graph 374 includes flow paths $346_0$, $346_1$, $362_0$, and $362_1$. These flow paths arise from the bidirectional polarity of the instantiation paths 346 and 362.

Figures 4A, 4B:
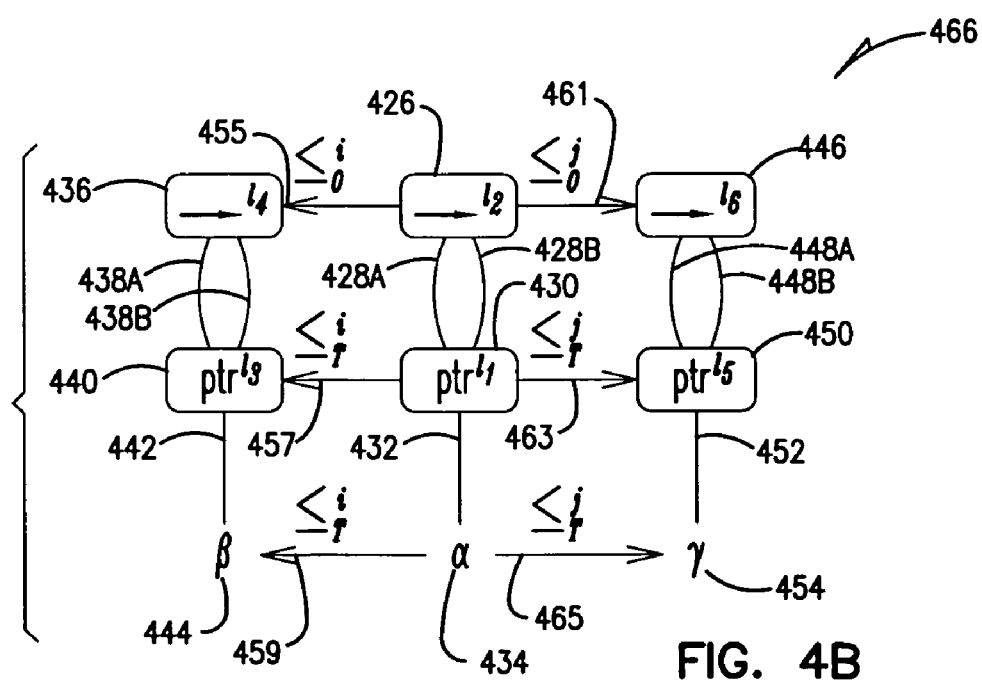

FIGS. 4A, 4B, 4C illustrate a sequence of processing according to one aspect of the present invention. FIG. 4A illustrates a fragment 400 of a program according to one aspect of the present invention. Through these Figures, various embodiments of the present invention will show that imprecise paths are identified and eliminated or inhibited so as to enhance context-sensitivity of flow analysis. The fragment 400 is used for illustrative purposes only. The fragment 400 includes a function definition statement 402. The function definition statement 402 defines a function id. The function id is a function that takes a pointer to an integer and returns a pointer to an integer. The fragment 400 includes a comment 404. The comment 404 shows the inferred types for the function signature of the function id.

The fragment 400 includes a function definition statement 406 to define a function foo. The definition of the function foo includes a declaration statement 408. The declaration statement 408 declares a variable b as an integer. The fragment 400 includes a comment 410. The comment 410 shows the inferred type for the declaration of the variable b. The definition of the function foo includes a function invocation statement 412. The function invocation statement 412 invokes the function id with the address of b as the input argument. The fragment 400 includes a comment 414 that shows the inferred types for the invocation of the function id at statement 412.

The fragment 400 includes a function definition statement 416 to define a function bar. The definition of the function bar includes a declaration statement 418. The declaration statement 418 declares a variable c as an integer. The fragment 400 includes a comment 420. The comment 420 shows the inferred type for the declaration of the variable c. The definition of the function bar includes a function invocation statement 422. The function invocation statement 422 invokes the function id with the address of c as the input argument. The fragment 400 includes a comment 424 that shows the inferred types for the invocation of the function id at statement 422.

FIG. 4B shows a graph following the next sequence of processing. A type instantiation graph 466 (hereinafter, the type graph 466) is formed from a portion of the types inferred from the fragment 400. The nodes 426, 430, and 434 are formed from the inferred types as indicated in the comment 404. The nodes are also related through the lines $428_a$, $428_b$, and 432. These lines $428_a$, $428_b$, and 432 represent the relationship between the types as inferred from the function signature of the function id.

The nodes 436, 440, and 444 are formed from the inferred types as indicated in the comment 414. The nodes are also related through the lines $438_a$, $438_b$, and 442. These lines $438_a$, $438_b$, and 442 represents the relationship between the types as inferred from the function signature of the function id. In one embodiment, the nodes 436, 440, and 444 represent instance types of the generic types as represented by nodes 426, 430, and 434. The instantiation paths 455, 457, and 459 represent the instantiations of these instance types.

The nodes 446, 450, and 454 are formed from the inferred types as indicated in the comment 424. The nodes are also related through the lines $448_a$, $448_b$, and 452. These lines $448_a$, $448_b$, and 452 represent the relationship between the types as inferred from the function signature of the function id. In one embodiment, the nodes 446, 450, and 454 represent instance types of the generic types as represented by nodes 426, 430, and 434. The instantiation paths 461, 463, and 465 represent the instantiations of these instance types.

FIG. 4C shows a graph following the next sequence of processing. A flow graph 468 is formed from the type graph 466. The flow graph 468 includes flow paths $455_0$ and $461_0$. The flow graph 468 includes flow paths $459_0$, $459_1$, $465_0$, and $465_1$. The flow paths $459_0$, $459_1$, $465_0$, and $465_1$ are formed from the bidirectional polarity of the instantiation paths 459 and 465. The flow graph 468 includes flow paths $457_0$, $457_1$, $463_0$, and $463_1$. The flow paths $457_0$, $457_1$, $463_0$, and $463_1$ are formed from the bidirectional polarity of the instantiation paths 457 and 463.

The flow graph 468 includes at least one imprecise path. For illustrative purposes only, suppose a question is posed to a flow analysis regarding what could be returned at the invocation of the function id at statement 422. Without the use of at least one embodiment of the present invention, the answer to that question would include a pointer to location $l_3$ and a pointer to location $l_5$ via the path $457_1$ and $463_0$. Such a path is an imprecise path because it traces a flow from the invocation of the function id at statement 412, through the definition of the function id at statement 402, and returning to the site of another invocation of the function id at the statement 422. Such an imprecise path corrupts the flow analysis and renders such an analysis context-insensitive.

In one embodiment, at least one imprecise path is inhibited. In another embodiment, at least one imprecise path is eliminated. In another embodiment, the flow analysis considers a set of paths that excludes at least one imprecise path so as to enhance context-sensitivity of the flow analysis. In one embodiment, the imprecise path includes an edge that has a negative polarity (1 polarity) preceding an edge that has a positive polarity (0 polarity). In one embodiment, the imprecise path includes a path that includes a flow of a parameter from an invocation of a function and a flow of a result of a function back to another invocation of the function. In one embodiment, the flow analysis considers a set of paths where each path begins with any number of edges of positive polarity and is followed by any number of edges of negative polarity. In one embodiment, a path, as used hereinbefore and hereinafter, means the inclusion of a sequence of edges. In another embodiment, the path means the inclusion of at least one edge.

FIG. 5 is a process diagram of a method according to one aspect of the present invention. A process 500 is a method for enhancing flow analysis. The process 500 includes an act 502 for inferring types from a program, an act 504 for forming a type graph from the types, and an act 506 for forming a flow graph from the type graph to inhibit imprecise paths so as to enhance context-sensitivity of flow analysis.

The act 502 for inferring types includes an act for generating constraints from the program and solving the constraints. The constraints include a set of equalities and inequalities. In one embodiment, the set is a finite set. In another embodiment, the set is adapted to be a set of simultaneous equations. An equality from the set of equalities defines that a type is equal to another type such that the type and the another type are adapted to be unified. The process of unification is discussed by Bjarne Steensgaard, *Points-to Analysis In Almost Linear Time*, Conference Record of the Twenty-Third ACM Symposium on Principles of Programming Languages, p. 32-41 (January 1996). Such process of unification does not limit the embodiments of the present invention, and as such, will not be presented here in full. An inequality from the set of inequalities defines that a type is an instance of another type. The inequality includes an instantiation constraint. The instantiation constrain includes an index and a polarity.

In one embodiment, the method for enhancing flow analysis includes an act for forming a type graph that includes polarities and indices and an act for forming a flow graph that includes a set of flow paths. The set of flow paths excludes imprecise paths so as to enhance context-sensitivity of flow analysis. The act of forming the set of flow paths includes forming at least one flow path that inherits a polarity from the polarities of the type graph. The imprecise path includes two flow edges; the polarity of one of the two flow edges is negative and the polarity of the other of the two flow edges is positive. The one of the two flow edges preceding the other of the two flow edges defines the imprecise path. In one embodiment, each polarity indicates at least one of a value flowing into a type and a value flowing out of a type.

In another embodiment, the method for enhancing flow analysis includes an act for abstracting program expressions into types and forming a type graph from the types. The act of abstracting allows the flow analysis to track the flow at the level of types instead of at the level of values. The type graph includes polarities and indices so as to enhance flow analysis. The act of forming includes forming a plurality of nodes. Each node represents a type. The act of forming includes forming at least one instantiation path between two nodes to represent an instantiation of a generic type to an instance type. The instantiation path includes an index and a polarity. The act of abstracting includes unifying recursive types. The act of unifying is adapted to be executed using a cyclic unification technique.

In another embodiment, the method for enhancing flow analysis includes an act for annotating each expression in a program by a label. The method includes an act for associating the label of an expression with a type of the expression. The method also includes an act for tracing at least one path on a type graph having polarities to determine if a value arising at one label in the program flows to another label in the program.

In another embodiment, the method for enhancing flow analysis includes an act for forming a type instantiation graph that includes polarities and indices and an act for computing points-to information for at least one program point by answering reachability queries on the type instantiation graph. The act of forming includes forming with a polymorphic inference technique based on instantiation constraints. In one embodiment, polymorphism means the inclusion of context-sensitivity with respect to types. In another embodiment, context-sensitivity means that a program expression, such as a function, can be instantiated to different types in different contexts if the program expression is of a particular polymorphic type. The act of answering includes answering the reachability queries within a desired duration. The desired duration is linearly proportional to a size of the type of the instantiation graph.

In another embodiment, the method for enhancing flow analysis includes an act for forming a type instantiation graph that includes polarities and indices. The method includes an act for forming a flow graph to form a set of flow paths. The method further includes an act for forming a subset from the set of flow paths to enhance the context-sensitivity of flow analysis. The set of flow paths includes at least one imprecise path. The subset excludes the at least one imprecise path.

FIG. 6 is a process diagram of a method according to one aspect of the present invention. A process 600 is a method for inferring types to enhance flow analysis. The process 600 includes an act 602 for generating constraints from a program and an act 604 for solving the constraints to infer at least one type. The act of solving includes propagating polarities so as to enhance flow analysis. Each polarity is adapted to indicate at least one of a negative polarity, a positive polarity, and a bidirectional polarity. The negative polarity defines that a value is flowing into a type. The positive polarity defines that a value is flowing out of a type. The bidirectional polarity defines a combination of a negative polarity and a positive polarity.

In one embodiment, the act 602 for generating constraints may be mathematically illustrated by the type rules presented following this paragraph. These rules are of the form $A \vdash e : \sigma / C$. $\sigma$ represents either a location or a type. One interpretation of the form of the rules includes the following: in the type environment A, expression e can be given type or location $\sigma$, on the condition of the constraint set C. A type environment A is a set of assignments of the form $x:[\tau]^I$. Such a form means the inclusion of assigning the location $[\tau]^I$ to program variable x. The constraint set C includes a set of equalities and inequalities between types, written as $\tau = \tau'$ and $$\tau \leq_{polarity}^{index} \tau',$$

respectively. An equality $\tau = \tau'$ means the inclusion that the types $\tau$ and $\tau'$ be selectively unified. An inequality $$\tau \leq_{polarity}^{index} \tau'$$

means the inclusion that $\tau'$ is an instance of $\tau$. Such an inequality is generated whenever type rule [Fun] (discussed below) is applied. $\tau$, in such an inequality, represents a type inferred from the definition of a function f (via rule [Def] which is discussed below). $\tau'$ represents the instance type inferred for a particular use of the function f (for example, via rule [Call] which is discussed below). A portion of the type rules are now presented:

$$[Fun] \frac{\beta \text{ fresh}}{A \vdash f_i : \beta / \{\alpha_f \leq_o^i \beta\}}$$

$$[Var] \frac{A(x) = [\tau]^l}{A \vdash x : [\tau]^l / \emptyset}$$

$A \vdash e_0 : \tau_0 / C_0$ $A \vdash e_1 : \tau_i / C_i (i=1 \ldots n)$ $C' = \bigcup_{j=0}^n C_j$ $$[Call] \frac{C'' = \{\tau_0 = (\tau_1, \ldots, \tau_n) \to \tau\}}{A \vdash e_0(e_1, \ldots, e_n) : \tau / C' \cup C''}$$

$A \vdash e_i : [\tau]^l / C_1$ $A \vdash e_2 : \tau' / C_2$ $$[Asn] \frac{C_3 = \{\tau = \tau'\}}{A \vdash e_1 = e_2 : \tau' / C_1 \cup C_2 \cup C_3}$$

$$[Rval] \frac{A \vdash e : [\tau]^l / C}{A \vdash e : \tau / C}$$

$$[Addr] \frac{A \vdash e : [\tau]^l / C}{A \vdash \&e : ptr^l(\tau) / C}$$

$$[Deref] \frac{A \vdash e : ptr^l(\tau) / C}{A \vdash {*} e : [\tau]^l / C}$$

$A \vdash s_1 : C_1$ $$[Cmp] \frac{A \vdash s_2 : C_2}{A \vdash s_1; s_2 : C_1 \cup C_2}$$

-continued $$[Local] \frac{A, x : [\tau]^l \vdash s : C}{A \vdash \text{local } x \text{ in } s : C}$$

$A, x_1 : [\tau_1]^{l_1}, \ldots, x_n : [\tau_n]^{l_n} \vdash s : C$ $$[Def] \frac{C' = C \cup \{\alpha_f = (\tau_1, \ldots, \tau_n) \to^l \alpha_{ref(f)}\}}{A \vdash f(x_1, \ldots, x_n)\{s\} : C'}$$

$A \vdash e : \tau / C$ $$[Ret] \frac{C' = C \cup \{\alpha_{ref(f)} = \tau\}}{A \vdash \text{return}_f e : C'}$$

The [Fun] rule is selectively applied whenever the constraint generation encounters a function invocation, such as $f_i$, in a program. The index i indicates a particular occurrence of the invocation of the function $f$. The type of the function $f$ is unknown and is given a type variable $\beta$. However, $\beta$ must be a type that is an instantiation of another unknown type $\alpha_f$. The constraint generation prescribes the polarity of the instantiation as positive (or 0) in such an instantiation. The [Fun] rule incorporates function pointers seamlessly into the analysis.

The act 604 for solving the constraints includes the following constraint closure rule $\tau \leq_p^i \tau_1 \wedge \tau \leq_q^i \tau_2 \Rightarrow \tau_1 = \tau_2$. Notice that the index i is the same on both inequalities. This rule indicates that any two occurrences of the same type variable get instantiated to the same type, within a single instantiation. Such a rule collapses well-matched call/return flow of a flow analysis, such that the computation of flow analysis is enhanced since those well-matched call/return flows need not be considered.

Another aspect of the act 604 includes propagating polarities. Polarities propagate to constraints on subterms of types according to the variance of the subterm. Covariant subterms inherit the polarity from the parent, contravariant subterms obtain the negated polarity of their parent, and non-variant subterms obtain the T polarity. Since subterms of pointer types are non-variant, the polarity is symbolized as T. Two propagation rules include:

$$(\tau_1, \ldots \tau_n) \to^l \tau \leq_p^i (\tau'_1, \ldots \tau'_n) \to^{l'} \tau' \Leftrightarrow \tau_k \leq_{-p}^i \tau'_k$$
$$\wedge \tau \leq_p^i \tau' \wedge l \leq_p^i l' \qquad \text{a)}$$

$$ptr^l(\tau) \leq_p^i ptr^{l'}(\tau') \Leftrightarrow \tau \leq_T^i \tau' \wedge l \leq_p^i l' \qquad \text{b)}$$

Negation of polarities is defined as follows: $-0=1$, $-1=0$, and $-T=T$.

Figure 7:
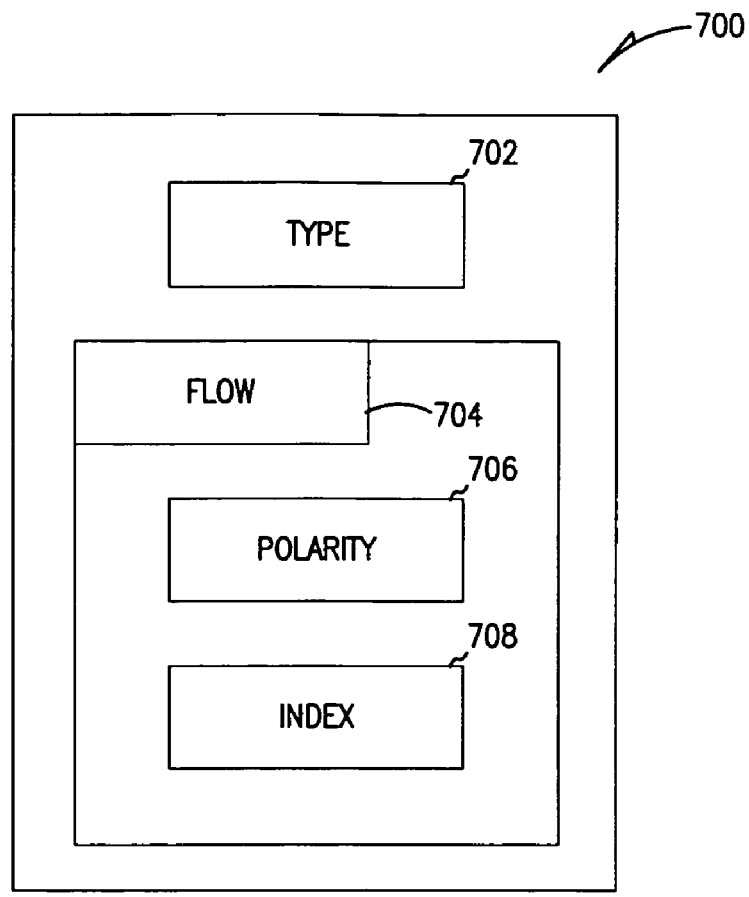
FIG. 7 is a structure diagram of a data structure according to one aspect of the present invention.

FIG. 7 is a structure diagram of a data structure according to one aspect of the present invention. A data structure 700 is used to enhance flow analysis. The data structure 700 includes a data member type 702 to represent a type of a program expression and a data member flow 704 to represent a flow path between two types. The data member type 702 is adapted to contain at least one of a generic type and an instance type. The data member type 702 is adapted to contain an instance type that is an instantiation of a function type.

The data member flow 704 includes a data member polarity. The data member flow 704 also includes a data member index. In one embodiment, the data member flow 704 contains an address of another type so that the data member flow represents a flow path between the data member type and the another type.

Figure 8:
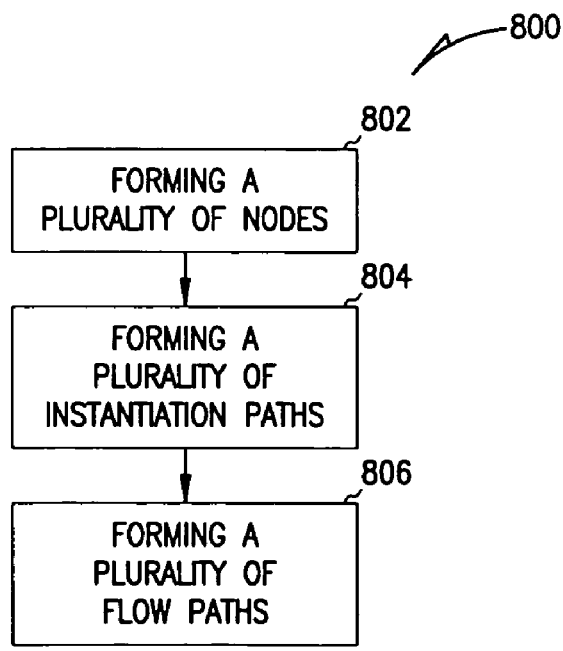
FIG. 8 is a process diagram of a method according to one aspect of the present invention.

FIG. 8 is a process diagram of a method according to one aspect of the present invention. A process 800 is a method for forming a graph to enhance flow analysis. The process 800 includes an act for forming a plurality of nodes to represent types. The process 800 includes an act for forming a plurality of instantiation paths to represent instantiations of generic types to instance types. Each instantiation path includes an index and a polarity. The process 800 further includes an act for forming a plurality of flow paths to represent a flow of values between types. Each flow path includes a polarity that is inherited from an instantiation path. The polarity defines at least one of an ingress and an egress flow of value with respect to a type. The index defines an occurrence of an instantiation of a generic type to an instance type so as to differentiate among occurrences of instantiations of the generic type to the instance type.

CONCLUSION

Methods and structures have been discussed to enhance flow analysis for programs. Such enhancement allows tools such as program optimizers, error detection tools, and user feedback tools to make superior assumptions about programs under analysis. One result from such enhancement includes software products that may run faster, contain fewer bugs, or both. These methods allow a flow analysis to scale well to large programs while providing a desired level of analytical precision within a desired duration of analysis. The methods described hereinbefore comprise a number of acts, but the invention is not so limited since these acts can be performed together as a single act or any combinations of acts.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A method performed on a computer for enhancing flow analysis, comprising: abstracting program expressions into types; and forming a type graph from the types, wherein the type graph includes polarities and indices so as to enhance flow analysis, and wherein forming includes forming at least one instantiation path between two nodes to represent an instantiation of a generic type to an instance type.

2. The method of claim 1, wherein forming includes forming a plurality of nodes, wherein each node represents a type.

3. The method of claim 1, wherein forming includes forming at least one instantiation path that includes an index and a polarity.

4. A computer readable storage medium having instructions stored thereon for causing a computer to perform a method for enhancing flow analysis, the method comprising:
   abstracting program expressions into types;
   forming a type graph from the types, wherein the type graph includes polarities and indices so as to enhance flow analysis, wherein the forming includes forming at least one instantiation path between two nodes to represent an instantiation of a generic type to an instance type.

5. A computer-readable storage medium having instructions stored thereon for causing a computer to enhance flow analysis, comprising:
   abstracting program expressions into types and forming a type graph from the types, wherein the type graph includes polarities and indices so as to enhance flow analysis, wherein the forming includes forming at least one instantiation path between two nodes to represent an instantiation of a generic type to an instance type; wherein a data member type represents a type of a program expression; and wherein a data member flow includes a data member polarity and a data member index to represent a flow path between the data member type and another data member type.

6. The computer-readable storage medium of claim 5, wherein the data member type is adapted to contain at least one of a generic type and an instance type.

7. The computer-readable storage medium of claim 5, wherein the data member type is adapted to contain an instance type that is an instantiation of a function type.

8. The computer-readable storage medium of claim 5, wherein the data member type is adapted to contain an instance type that is an instantiation of a pointer type.

9. A computer-readable storage medium having instructions stored thereon for causing a computer to form a graph for enhancing program analysis, the graph comprising:
   a plurality of nodes, wherein each node represents a type, wherein the type is abstracted from a program expression;
   a plurality of instantiation lines that represent type instantiation and form a plurality of paths between the plurality of nodes, wherein at least one of the plurality of the paths represents an instantiation of a generic type to an instance type; and
   a plurality of flow lines associated with the plurality of instantiation lines, wherein each flow line represents a flow direction of at least one value.

10. The graph of claim 9, wherein each instantiation line emanates from one node that is indicative of a generic type expression and ends at another node that is indicative of an instance type expression to define an instantiation direction.

11. The graph of claim 9, wherein each flow line includes a polarity, wherein each flow line emanates from one node that is indicative of the source of the at least one value and ends at another node that is indicative of the target of the at least one value to define a flow direction.

12. The graph of claim 11, wherein each instantiation line includes an 10 instantiation constraint.

13. The graph of claim 12, wherein the instantiation constraint includes an index and a polarity, wherein the index represents an occurrence of an instantiation of the generic type to the instance type.

14. The graph of claim 13, wherein the polarity of the flow line is positive if the polarity of the instantiation line is positive, wherein the polarity of the flow line is negative if the polarity of the instantiation line is negative.

15. The graph of claim 13, wherein the flow direction of the flow line is the same as the instantiation direction of the instantiation line if the polarity of the instantiation line is positive, wherein the flow direction of the flow line is opposite the instantiation direction of the instantiation line if the polarity of the instantiation line is negative.

* * * * *